US008874907B1

(12) United States Patent
Christensen et al.

(10) Patent No.: US 8,874,907 B1
(45) Date of Patent: Oct. 28, 2014

(54) CONTROLLING ACCESS TO AN NFS SHARE

(75) Inventors: Aaron Christensen, St. Paul Park, MN (US); Prabhu Damodharan, Shoreview, MN (US); William Browning, Blaine, MN (US); Weibao Wu, Vadnais Heights, MN (US); Xianbo Zhang, Madison, WI (US)

(73) Assignee: Symantec Operating Corporation, Mountain View, CA (US)

( * ) Notice: Subject to any disclaimer, the term of this patent is extended or adjusted under 35 U.S.C. 154(b) by 1955 days.

(21) Appl. No.: 11/864,621

(22) Filed: Sep. 28, 2007

(51) Int. Cl.
*H04L 29/06* (2006.01)

(52) U.S. Cl.
USPC .......................................................... 713/165

(58) Field of Classification Search
CPC .................. G06F 21/6218; H04L 63/1433
USPC ................... 713/165, 154, 155; 380/28, 277
See application file for complete search history.

(56) References Cited

U.S. PATENT DOCUMENTS

| 5,717,756 | A | * | 2/1998 | Coleman ........................ 713/155 |
| 5,737,523 | A |  | 4/1998 | Callaghan et al. |
| 6,006,018 | A |  | 12/1999 | Burnett et al. |
| 6,907,414 | B1 |  | 6/2005 | Parnell |
| 7,287,050 | B2 |  | 10/2007 | Christoph |
| 7,287,271 | B1 |  | 10/2007 | Riggins |
| 7,395,431 | B2 |  | 7/2008 | Fukushima et al. |
| 7,395,439 | B2 |  | 7/2008 | Elbe et al. |
| 2004/0236745 | A1 | * | 11/2004 | Keohane et al. ................... 707/9 |
| 2008/0077752 | A1 | * | 3/2008 | Kinoshita ..................... 711/154 |

OTHER PUBLICATIONS

Steiner, et al.; "Kerberos: An Authentication Service for Open Network Systems"; Proceedings of the Winter 1988 Usenix Conference; Feb. 1988; published Jan. 12, 1998; retrieved from Internet: http://www.cse.nd.edu/~dthain/courses/cse598z/fall2004/papers/kerberos.pdf; 15 pages.
Callaghan, et al.; "NFS Version 3 Protocol Specification"; Sun Microsystems, Inc.; Jun. 1995; 20 pages.
Pawlowski, et al.; "The NFS Version 4 Protocol"; Network Appliance, Inc.; 2005, retrieved from Internet: http://networkappliance.com/library/tr/3085.pdf; 30 pages.
Lampson, et al.; "Authentication in Distributed Systems: Theory and Practice"; ACM Transactions on Computer Systems; vol. 10, Issue 4; Nov. 1992; retrieved from Internet: http://gatekeeper.research.compaq.com/pub/DEC/SRC/research-reports/SRC-083.pdf; 47 pages.

(Continued)

*Primary Examiner* — Farid Homayounmehr
*Assistant Examiner* — Suman Debnath
(74) *Attorney, Agent, or Firm* — Meyertons Hood Kivlin Kowert & Goetzel, P.C.; Jeffrey C. Hood

(57) ABSTRACT

Providing authentication of users accessing an NFS shared file system. A shared secret is used as a component of the mount point used to access the NFS share. Upon receiving a request to access to the data in the NFS share, the process creates at least one cryptographic value and then creates a path to the mount point which incorporates the cryptographic value. The process then creates the mount point at the path, e.g., /PATH:k1, where k1 is the cryptographic value. Creation of the mount point is preferably performed using NFS protocol semantics, without requiring any changes to the NFS protocol semantics. A second cryptographic value, k2, may be used for unmounting the mount point.

12 Claims, 5 Drawing Sheets

(56) References Cited

OTHER PUBLICATIONS

Satyanarayanan, M.; "Coda: A Highly Available File System for a Distributed Workstation Environment"; IEEE Transactions on Computers; vol. 39; 1990; retrieved from Internet: http://www.cs.cmu.edu/afs/cs/project/coda-www/ ResearchWebPagesldocdir/wwos2.pdf; 5 pages.

Howard, John H.; "An Overview of the Andrew File System"; Carnegie Mellon University; 1988; retrieved from Internet: http://systems.cs.colorado.edu/~grunwald/Classes/Fa112003-InformationStorage/Papers/afs_overview.pdf; 6 pages.

* cited by examiner

CONTROLLING ACCESS TO AN NFS SHARE

BACKGROUND OF THE INVENTION

1. Field of the Invention

The present application relates to a method for providing authentication of users accessing a shared NFS (Network File System).

2. Description of the Related Art

NFS (Network File System) is a network file system protocol originally developed by Sun Microsystems in 1984. NFS allows a user on a client computer to access files over a network as if the network devices were part of the client computer. Various network attached storage (NAS) applications use NFS as the file system structure and allow network storage of data that can be "served" to an enterprise.

Various companies offer backup software which allow for "backing up" or copying files stored on an NFS for data protection. This backup software provides for both backup and recovery of files in the NFS. For example, Symantec/ Veritas offers a product called Veritas NetBackup™ (or "NBU"). NetBackup performs backup and recovery of data using NDMP (Network Data Management Protocol). The NDMP protocol allows NDMP client software, such as Veritas NetBackup, to send messages over the network to an NDMP server application to initiate and control backup and restore operations.

The various types of backup software maintain a backup area for storing backup images and a catalog for storing metadata related to the backup. For example, the Veritas NetBackup™ software maintains an NBU catalog and NBU backup data area for storing metadata and backup images, respectively.

Backup software can create security issues for the data in an NFS share. For example, metadata and backup images in the NBU catalog and NBU backup data are exposed via the NFS protocol. From a security standpoint, it is undesirable to allow any interested party to access and/or casually browse this data. For example, competitors could easily gain access to the NBU catalog and backup images via this well understood and implemented protocol.

Therefore, improved methods are desired for providing security to data files and metadata maintained by network backup software.

SUMMARY OF THE INVENTION

Embodiments of the present invention include a novel method for providing authentication of users accessing a shared file system implemented according to the NFS protocol (referred to as an "NFS share"). In other words, the method may provide controlled access to data that is accessible via the NFS protocol. Embodiments of the invention make use of a shared secret as a component of the mount point used to access the NFS share.

The method may comprise a server process receiving a request from a client program to gain access to the data in the NFS share. The data may comprise a backup catalog and backup images maintained by backup software in a Network File System shared memory. The server process receives the request and authenticates the client program. The server process may then request a second process (referred to as "nbfsd" or "Net Backup File System Daemon") to create a mount point which comprises the data in the NFS share.

In response to the request, the second process creates one or more cryptographic values, preferably two cryptographic values referred to as k1 and k2. The second process then creates a path to the mount point which incorporates the at least one cryptographic value, e.g., k1. For example, the second process may create the path wherein k1 forms part of the path. As one example, the path may have a form /PATH:k1. The second process then creates the mount point at the path (/PATH:k1). Creation of the mount point is preferably performed using NFS protocol semantics, without requiring any changes to the NFS protocol semantics. The second process may also provide the cryptographic values k1 and k2 to both the requesting client program and to the server program over secure channels.

The mount point is useable by the client program to access the data in a secure manner. For example, the client program may generate a mount request to mount the path. The second process receives the mount request and locks the mount point for use only by the client program. The client program may then access the various data, such as the backup catalog and backup images maintained by backup software in the NFS shared memory.

After the client program has performed its various desired (read and/or write) operations using the data, the client program unmounts the path (/PATH:k1). The client program requests the unmount of the first path (/PATH:k1) by requesting an unmount operation using a second path which incorporates the second cryptographic value (/PATH:k2). Thus, in order to unmount /PATH:k1 the client program does not perform an unmount on /PATH:k1, but rather performs an unmount on /PATH:k2. The second process recognizes the cryptographic variable k2 and associates k2 with the first path /PATH:k1. In response to detecting the unmount request for /PATH:k2, the second process performs the unmount on /PATH:k1.

Thus the new path /PATH:k2 is used to signify an unmount request for the first or original path /PATH:k1. This new path is used because the original path /PATH:k1 has since passed over the network in an unsecure manner, and thus it is possible for any entity that has captured this value to perform an (undesired) unmount on /PATH:k1. Thus the other previously undisclosed, secret cryptographic value k2 is used to signify an authorized unmount request for /PATH:k1. After the first path (PATH:k1) has been unmounted, the second process destroys the mount point (/PATH:k1).

Other client programs or processes are not allowed access to the mount point (/PATH:k1), and after the unmount is performed, the same client program (or other processes) are preferably required to request access to a new mount point in order to view the NFS share.

The method may thus only allow access to the NFS share by authorized hosts and users (principals). In certain embodiments, the method may allow only one connection to a mount point exposing NBU catalog data and backup images, wherein this one connection is provided only to an authorized user. Thus, authorized users will be the only ones able to mount these sensitive mount points. Once an authorized user has disconnected from the mount point, the mount point disappears and may not be reused.

BRIEF DESCRIPTION OF THE DRAWINGS

A better understanding of the present invention can be obtained when the following detailed description of the preferred embodiment is considered in conjunction with the following drawings, in which.

Figure 1:
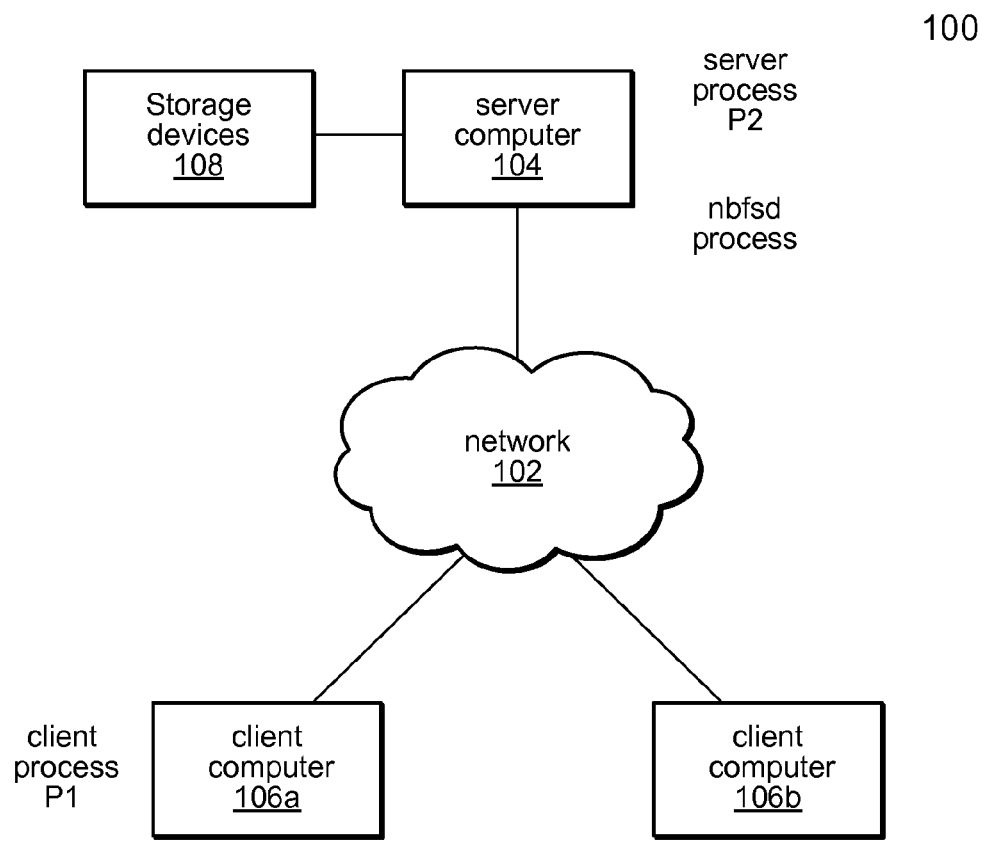
FIG. 1 illustrates an exemplary network system.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1

Exemplary Network System

FIG. 1 illustrates an exemplary network system 100 according to one embodiment of the invention. As shown, the network system 100 includes a network 102, one or more server computer systems 104 and one or more client computer systems 106. The one or more server computer systems 104 and the one or more client computer systems 106 are coupled to the network 102. The server computer system 104 may comprise or be coupled to one or more storage devices 108. Thus, one or more storage devices 108 may be coupled to the server computer system 104. The server computer 104 and/or the one or more storage devices 108 may store data according to an NFS protocol, referred to as an "NFS share".

Network backup software is stored on the server computer system 104 and executes on the server computer system 104. The network backup software may operate to create and maintain various backup related data (including metadata), e.g., as a result of backup operations. The backup related data may comprise NBU (network backup) catalog and backup images. The backup related data may be stored on either the server computer 104 and/or the storage devices 108. As discussed above the network backup catalog (metadata) and backup images are exposed via the NFS protocol and thus are available to any requesting party. As also noted above, it may be undesirable for this metadata and backup images to be accessible to other parties. As described herein, one embodiment of the present invention operates to provide security for this data, e.g., to only allow access to this data to authorized parties.

As shown, a server process P2 executes on the server computer system 104. The server process P2 controls access to NFS mount points exposing the NBU catalog and backup images (referred to only as mount points from here on).

A process called nbfsd (Net Backup File System Daemon) is controlled by P2 and also executes on the server computer system 104. The nbfsd process exposes (or makes available) the mount point via NFS. In some embodiment, the server process P2 performs all of the operations described herein as being performed by nbfsd, and in these embodiments the separate process nbfsd is not necessary.

A client process P1 executes on the client computer 106a. The client process (or client program) P1 is the entity (principal) attempting to gain access to the backup related data. More specifically, the client process P1 is attempting to gain access to a mount point comprising the backup related data.

The term "mounting" is used in computer science to refer to the process of making a file system ready for use by the operating system. This is typically done by reading certain index data structures from storage into memory. The term "mounting" originates from early computing history when an operator had to physically mount a magnetic tape or hard disk on a spindle before using it.

The term "mount point" refers to a location where the computer places the files in a file system on Unix-like systems. A device can typically be mounted anywhere on the directory structure. Normally only the root user can mount a new file system but systems are often configured so that users may mount pre-set devices. A file system can be mounted by running a mount utility.

Figure 2A:
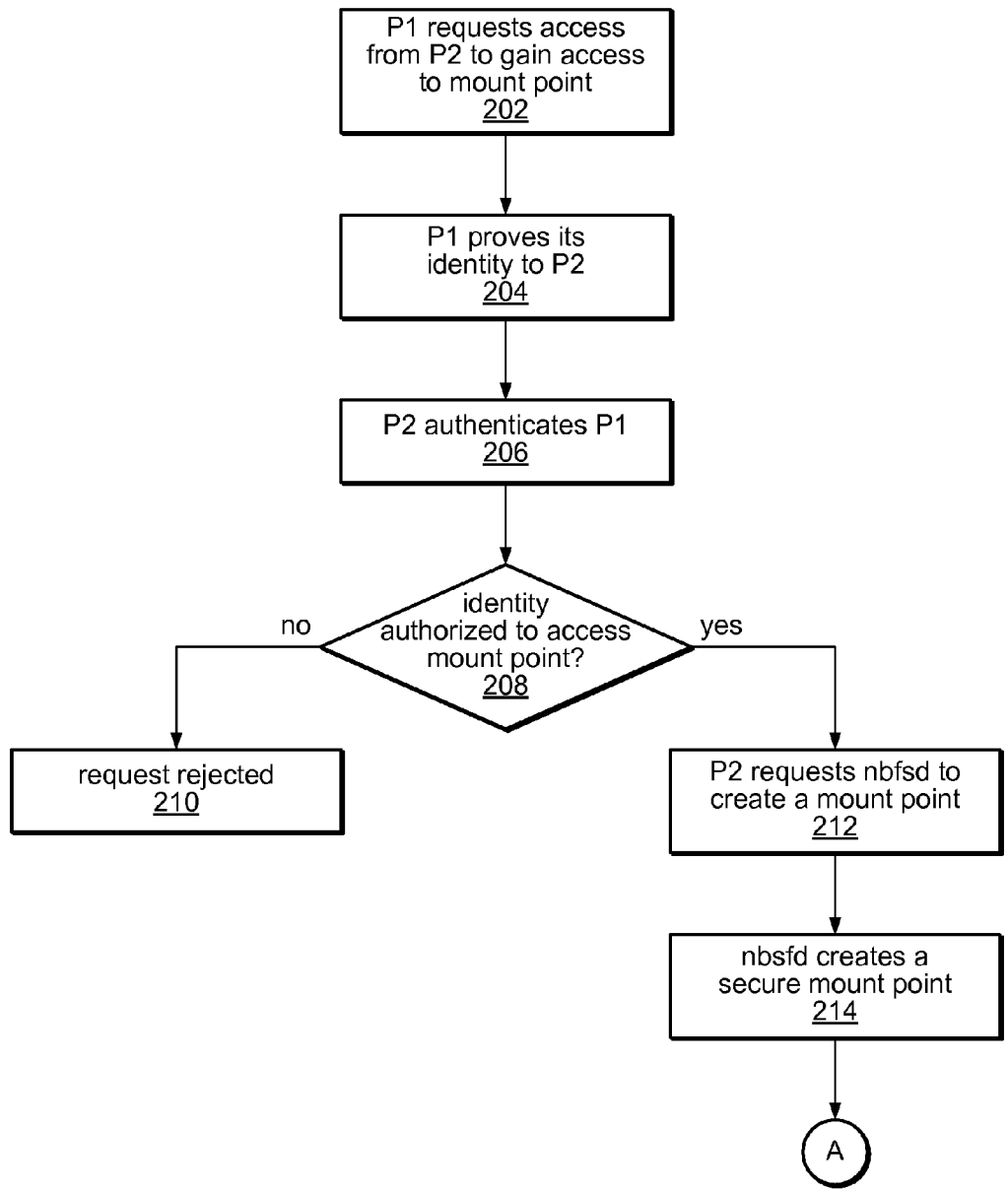
FIGS. 2A and 2B are a flowchart diagram illustrating operation of one embodiment of the method of the present invention.
Figure 2B:
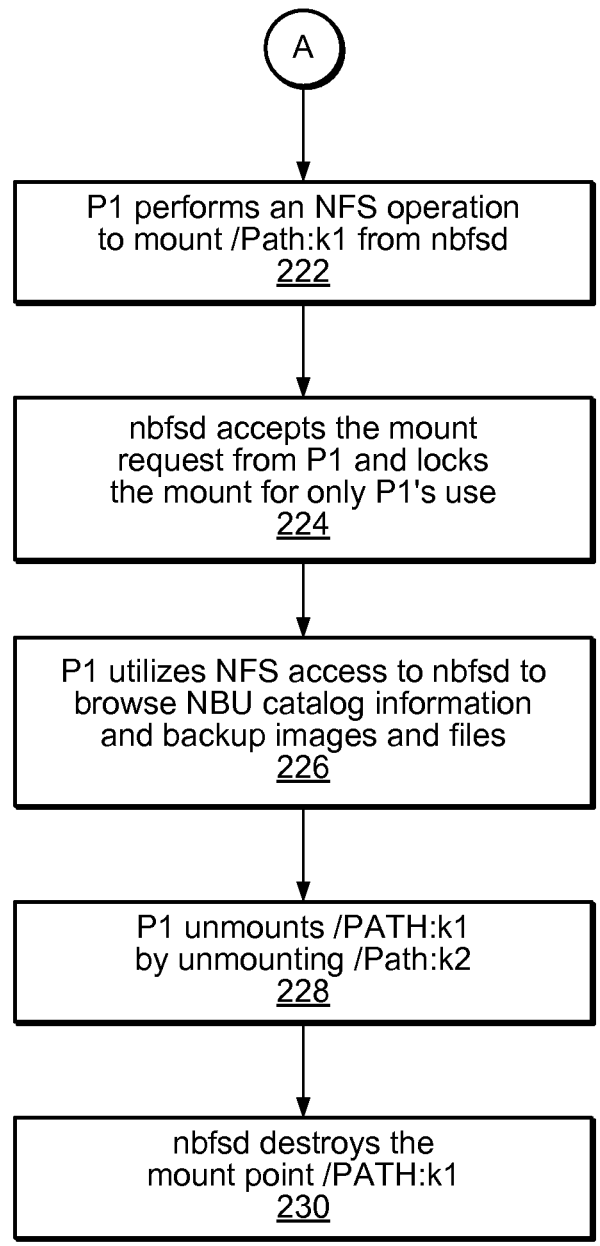

FIGS. 2A and 2B

FIGS. 2A and 2B collectively are a flowchart diagram illustrating operation of one embodiment of the invention. The flowchart of FIGS. 2A and 2B illustrate one exemplary embodiment, and it is noted that other embodiments of the invention may be used to implement the invention as claimed herein.

At 202 the client process P1 begins an exchange to gain access to a mount point by requesting access from server process P2. Thus at 202 P1 requests access to data (backup related data) maintained by the backup software, such as the NBU catalog and backup images. This request may be made to perform a data migration, or other operation.

At 204 P1 provides its identity to P2. This may be performed in any of various ways, such as by using a secure network communication protocol such as SSL.

At 206 P2 authenticates P1 in some manner, e.g., by using an authentication system involving username and password verification, among other methods.

At 208 P2 decides whether the identity provided by P1 is authorized to access a mount point. For example, P2 may compare the received identity with a list of authorized identities that it maintains.

If in 208 P2 determines that P1 is not authorized to access the backup relate data, i.e., is not authorized to access the mount point, then in 210 the request is rejected, and operation completes. If in 208 P2 determines that P1's identity is allowed access to the backup related data (the mount point), in 212 P2 requests that nbfsd (a separate process under control of P2) create a mount point for the backup related data.

At 214 nbfsd and/or P2 create the mount point for access to the backup related data (files) by P1. The manner in which nbfsd and P2 create the mount point for access to the backup related data by P1 is described in detail with respect to the flowchart of FIG. 3. The mount point may be created such that the path to the mount point incorporates a cryptographic value. For example, the path may include the cryptographic value k1, where k1 is a cryptographic key or value created for providing secured access to the mount point. In one exemplary embodiment, the path may have the form /PATH:k1. Thus it is noted that the authentication (the cryptographic key k1) is embedded as a component in the path to the mount point. This is a unique and novel method for ensuring that only an authenticated user gains access to the mount point.

Once the mount point has been created in 214, in 222 (FIG. 2B) P1 performs an NFS operation to request a mount of /Path:k1 from nbfsd.

At 224 nbfsd accepts the mount request from P1 and locks the mount for only P1's use. The process nbfsd locks the mount by denying access to other entities attempting to mount /Path:k1.

At 226 P1 has access to the new mount point (using path /PATH:k1) in order to view the NFS share of the NBU catalog and backup images. Thus at 226 P1 can access the NBU catalog and backup images, or other backup related data, stored in the NFS share to perform various tasks. For example, P1 may operate to locate a back up image for a particular host. Thus, after P1 performs an NFS operation to mount /PATH:k1 from nbfsd, and nbfsd accepts the mount request from P1 and locks the mount for only P1's use, from this point on, P1 has NFS access to nbfsd to browse NBU catalog information and backup images and files.

When P1 has completed its tasks with the mount point at /PATH:k1, at 228 P1 unmounts the mount point by requesting an unmount of /PATH:k2. P1 requests the unmount of /PATH:k2 by issuing an NFS request to unmount that path. It is noted that, in order to unmount /PATH:k1, P1 does not request an unmount on /PATH:k1, but rather requests an unmount on /PATH:k2. This is because now /PATH:k1 has been conveyed over the network without any security, and thus is available to third parties. It would therefore be possible for any entity having captured this value to unmount /PATH:k1. Therefore, P1 requests the unmount with the previously undisclosed secret value k2. This prevents unauthorized third parties from unmounting /PATH:k1 while it is in use by P1.

In 230 nbfsd destroys the mount point (/PATH:k1). The process nbfsd destroys the mount point by no longer servicing requests to mount that path.

While the mount point is active, no process other than P1 may access /PATH:k1. Also, after unmounting the mount point, P1 (or any other client program or process) preferably must request access to a new mount point from P2 in order to view the NFS share of the NBU catalog and backup images. After the mount point is destroyed, the mount point ceases to exist and hence is no longer available for use by any process.

FIG. 3

Creation of the Mount Point

Figure 3:
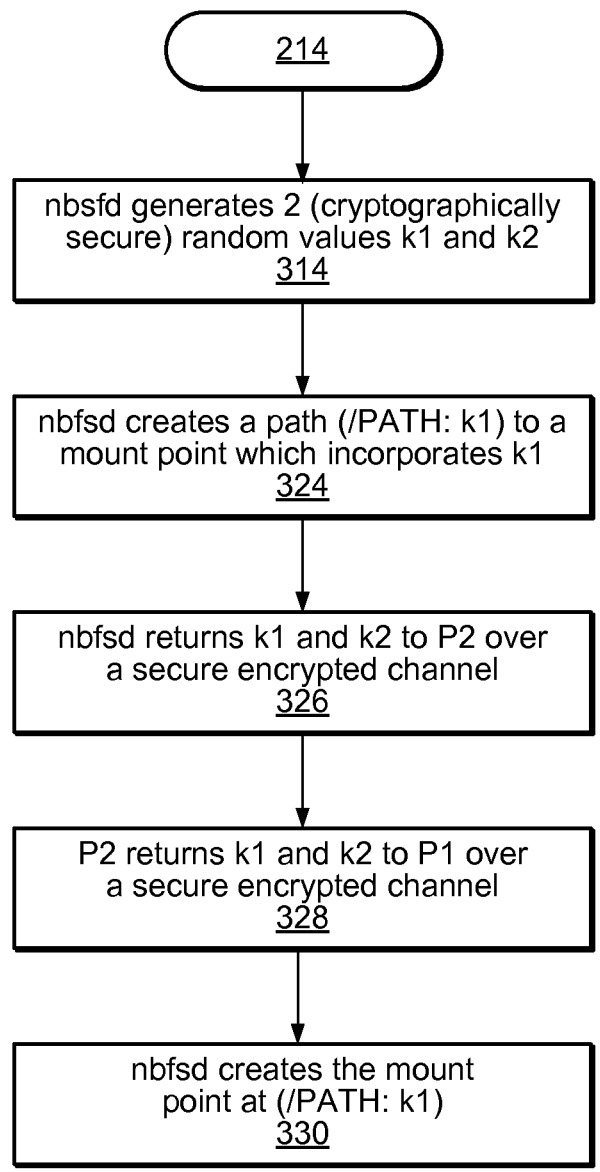
FIG. 3 is a flowchart diagram illustrating creation of a secure mount point in 214 of FIG. 2A.

FIG. 3 is a flowchart diagram illustrating creation of the mount point in 214 of FIG. 2A.

As shown, in 302 nbfsd generates two cryptographic values (cryptographically secure random values) k1 and k2. The term "cryptographic value" refers to a value that is sufficiently random or unique such that the value is not easily determined by another party that does not have access to the cryptographic value.

At 304 nbfsd creates a path to a mount point which incorporates k1. The path may take any of various forms, such as /path:k1, /path1/k1/path2, /k1/path, etc. The term "/PATH:k1" is used to refer to any of various types of paths incorporating k1 as part of the path. This mount point is a path to the NBU catalog and backup images exposed via NFS. As noted above, the mount point is preferably created whereby the authentication (k1) is embedded as a component in the path to the mount point, e.g., /PATH:k1. This is a unique and novel method for ensuring that only an authenticated user gains access to the mount point.

At 306 nbfsd provides the two cryptographic values k1 and k2 to P2 over a secure (i.e. encrypted) channel. The secure or encrypted channel may be created by using the SSL protocol.

At 308 P2 provides the two cryptographic values k1 and k2 to P1 over a secure (i.e. encrypted) channel. After 306 and 308, only the three entities nbfsd, P1, and P2 know the cryptographic values (or keys) k1 and k2.

At 310 nbfsd creates the mount point at /PATH:k1. The process nbfsd creates the mount point by mapping the data and files to /PATH:k1 and making it available for a mount request.

FIG. 4

Process Diagram

Figure 4:
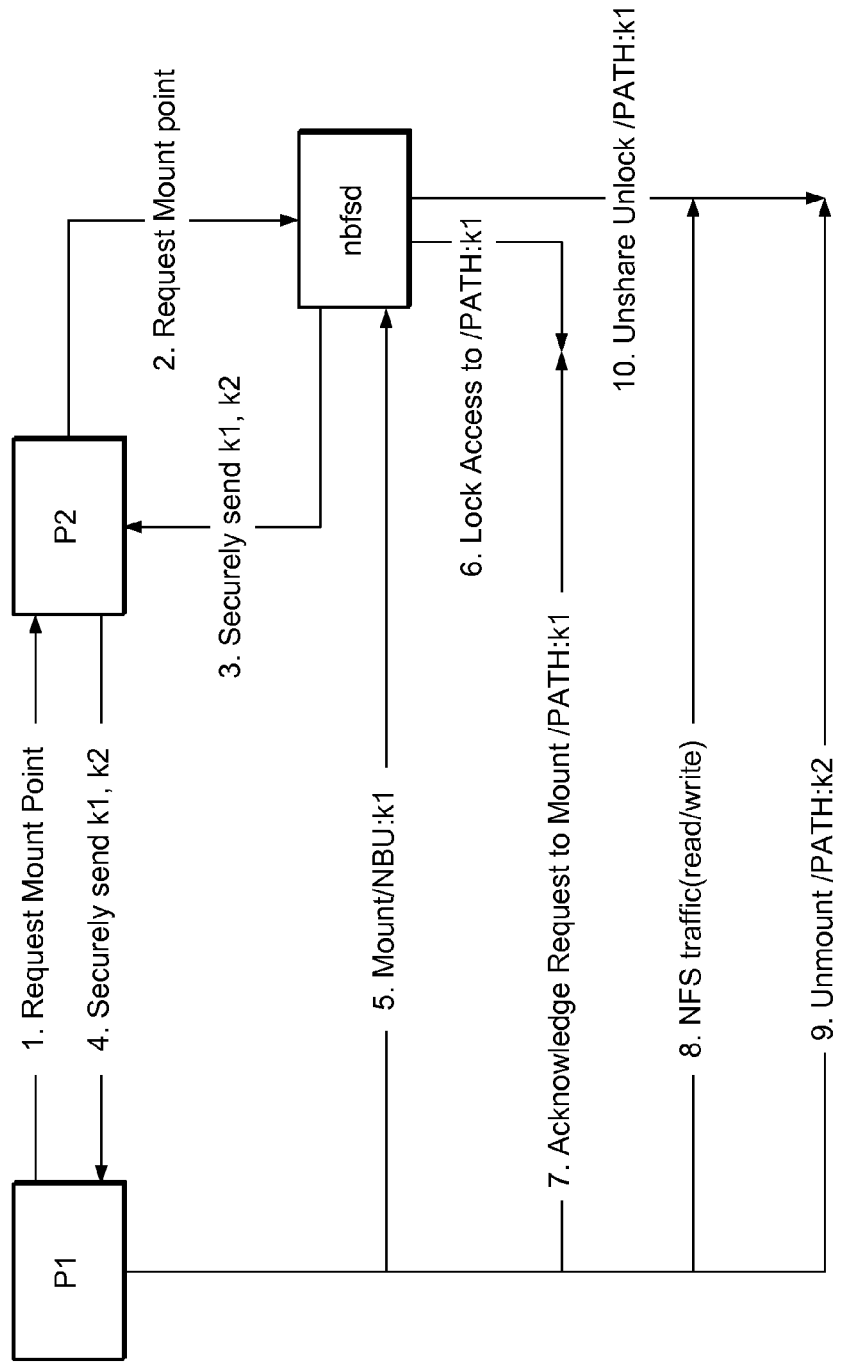
FIG. 4 is a process diagram illustrating operation of one embodiment of the method of the present invention.

FIG. 4 is a process diagram illustrating a method to control access to an NFS share. As shown, at 1 P1 requests a mount point from P2. At 2 P2 requests a mount point from nbfsd. At 3 nbfsd creates two random keys k1 and k2 and securely sends k1 and k2 to P2. At 4 P2 securely sends k1 and k2 to P1. At 5 P1 performs a mount of /NBU:k1. Thus the authentication key k1 is embedded as a component in the path to the mount point. At 6 nbfsd locks access to /PATH:k1. At 7 nbfsd acknowledges the request to mount /PATH:k1. AT 8 P1 performs various NFS traffic to access (read and/or write) the various data/files, such as the NBU catalog, backup images, etc. At 9, P1 unmounts the mount point using /PATH:k2. The use of the second authentication key (k2) provides greater security for the unmount, since k1 has now been transmitted over the network in an unsecure manner. At 10 nbfsd unshares and/or unlocks /PATH:k1 upon detecting the unmount request for /PATH:k2.

Embodiments of the invention may thus operate to only allow authorized principals (i.e. NBU Administrators or other NBU processes) access to an NFS share exposing the NBU Catalog and backup images. The method begins by authenticating the principal (the requesting client) and authorizing the client for access. Then, two securely random values are chosen such that they are computationally infeasible for anyone to guess. That is, only nbfsd knows the random values. A mount point path referred to as /PATH:k1 is constructed using one of the random values. It is computationally infeasible for anyone to guess /PATH:k1 because it incorporates the random value. Further, the mount point is not advertised or otherwise made publicly known. The nbfsd process then securely communicates k1 and k2 from nbfsd to P2 and then to the principal or requesting client P1. Only these three parties (nbfsd, P2 and P1) know the value of k1 and k2, and it is computationally infeasible to guess them.

Next, P1 mounts /PATH:k1 from nbfsd. nbfsd only allows one connection using /PATH:k1 (there may be multiple mount points using other random values). Because only P1, P2, and nbfsd know the value of the path (because of the random values k1 and/or k2 included in the path) P1 and P2 are the only entities capable of accessing the mount point. The threat of P2 accessing the mount point is neglected since nbfsd must trust P2 to tell it when to create a secure mount point. Therefore, the authorized entity P1 is the only entity that can access the mount point because it is the only one (other than P2 and nbfsd) that knows the value of k1, at this time. Access by unauthorized entities, such as competitors, is denied.

In order to unmount /PATH:k1, P1 does not request an unmount on /PATH:k1, but rather requests an unmount on /PATH:k2. nbfsd recognizes k2 and associates it with /PATH:k1, on which it performs the unmount./PATH:k1 is not unmountable because this path passes over the network "in the clear" or without security. It would therefore be possible for any entity having captured this value to unmount it. Therefore, the unmount is preferably done with another, previously undisclosed, secret value, k2.

Embodiments of the present invention operate to preserve the semantics of the NFS (NFSv3) protocol without requiring any changes to the protocol. Where embodiments of the invention make specific usage of this protocol, only the authentication mechanism is allowed to access nbfsd, and hence there is no other way to access the NBU catalog and other data files.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for controlling access to data that is accessible via a Network File System (NFS) protocol, the method comprising:
   utilizing a computer to perform:
      receiving a request from a client program to gain access to the data;
      authenticating the client program;
      creating a mount point which comprises the data, wherein said creating the mount point comprises:
         creating at least one cryptographic value, wherein said creating at least one cryptographic value comprises creating a first cryptographic value and a second cryptographic value;
         creating a path for the mount point which incorporates the at least one cryptographic value, wherein said creating the path comprises creating a first path to the mount point incorporating the first cryptographic value, and;
         creating the mount point at the path, wherein the mount point is useable to access the data in a secure manner;
      receiving a mount request from the client program to mount the path;
      accepting the mount request from the client program;
      locking the mount for use only by the client program;
      receiving a request to unmount the mount point using a second path which incorporates the second cryptographic value; and
      performing the unmount on the mount point using the first path which incorporates the first cryptographic value.

2. The method of claim 1,
   wherein said creating the mount point which comprises the data further comprises:
      providing the at least one cryptographic value to a server process over a secure channel;
      providing the at least one cryptographic value to a second process over a secure channel, wherein the second process is controlled by the server process;
   wherein the second process performs said creating the mount point which comprises the data.

3. The method of claim 1, further comprising:
   receiving an unmount request from the client program to unmount the path after said locking; and
   destroying the mount point based on the unmount request.

4. The method of claim 1,
   wherein said creating the mount point which comprises the data is performed using NFS protocol semantics.

5. The method of claim 1,
   wherein the data comprises a backup catalog and backup images maintained by backup software in a Network File System shared memory, wherein the backup catalog and backup images are created in response to backing up of files in the Network File System shared memory.

6. The method of claim 1,
   wherein said creating at least one cryptographic value comprises creating a value k1;
   wherein said creating the path to the mount point comprises creating a path having a form /PATH:k1.

7. A non-transitory computer readable memory medium storing program instructions for controlling access to data that accessible via a Network File System (NFS) protocol, wherein the program instructions are executable to:
   receive a request from a client program to gain access to the data;
   authenticate the client program;
   create a mount point which comprises the data, wherein in creation of the mount point, the program instructions are executable to:
      create at least one cryptographic value, wherein said creating at least one cryptographic value comprises creating a first cryptographic value and a second cryptographic value;
      create a path for the mount point which incorporates the at least one cryptographic value, wherein to create the path, the program instructions are executable to create a first path to the mount point incorporating the first cryptographic value, and;
      create the mount point at the path, wherein the mount point is useable to access the data in a secure manner;
   receive a mount request from the client program to mount the path;
   accept the mount request from the client program;
   lock the mount for use only by the client program;
   receive a request to unmount the mount point using a second path which incorporates the second cryptographic value; and
   perform the unmount on the mount point using the first path which incorporates the first cryptographic value.

8. The non-transitory computer readable memory medium of claim 7,
   wherein in creation of the mount point comprising the data, the program instructions are further executable to:
      provide the at least one cryptographic value to a server process over a secure channel;
      provide the at least one cryptographic value to a second process over a secure channel, wherein the second process is controlled by the server process;
   wherein the second process creates the mount point which comprises the data.

9. The non-transitory computer readable memory medium of claim 7, wherein the program instructions are further executable to:
   receive an unmount request from the client program to unmount the path after said locking; and
   destroy the mount point based on the unmount request.

10. The non-transitory computer readable memory medium of claim 7,
    wherein said creating the mount point which comprises the data is performed using NFS protocol semantics.

11. The non-transitory computer readable memory medium of claim 7,
    wherein the data comprises a backup catalog and backup images maintained by backup software in a Network File System shared memory, wherein the backup catalog and backup images are created in response to backing up of files in the Network File System shared memory.

12. The non-transitory computer readable memory medium of claim 7,
    wherein said creating at least one cryptographic value comprises creating a value k1;
    wherein said creating the path to the mount point comprises creating a path having a form /PATH:k1.

* * * * *